United States Patent
Chinitz et al.

(10) Patent No.: US 6,808,311 B2
(45) Date of Patent: Oct. 26, 2004

(54) VEHICLE WHEEL BEARING

(75) Inventors: Steven M. Chinitz, Huron, OH (US); William M. Sandy, Jr., Seven Hills, OH (US); Steven E. Faetanini, Sandusky, OH (US); Christopher W. Snavely, Clyde, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/073,792

(22) Filed: Feb. 11, 2002

(65) Prior Publication Data

US 2003/0152302 A1 Aug. 14, 2003

(51) Int. Cl.[7] .............................................. F16C 19/08
(52) U.S. Cl. ...................................... 384/537; 384/544
(58) Field of Search ................................. 384/544, 589, 384/545, 537, 585

(56) References Cited

U.S. PATENT DOCUMENTS

| | | | |
|---|---|---|---|
| 3,938,864 A | * | 2/1976 | Haussels ..................... 384/482 |
| 4,504,099 A | * | 3/1985 | Miki et al. ................... 384/543 |
| 6,485,187 B1 | | 11/2002 | Meeker et al. |
| 6,574,865 B2 | | 6/2003 | Meeker et al. |
| 6,622,377 B1 | | 9/2003 | Johnson et al. |
| 2002/0106140 A1 | * | 8/2002 | Uchman ...................... 384/544 |

* cited by examiner

Primary Examiner—Lenard A Footland
(74) Attorney, Agent, or Firm—Michael D. Smith

(57) ABSTRACT

A first vehicle wheel bearing has a monolithic shaft including two inner races and has a monolithic outer race assembly. A second bearing has a monolithic shaft including a shoulder and at least one inner race, wherein the shaft is positioned within the bore of a vehicle knuckle member with the shoulder abutting the knuckle. A third bearing has an end cap attached to an outer race assembly and covering the bearing-cavity outboard opening. A fourth bearing has an inboard seal covering the bearing-cavity inboard opening and extending outside the cavity to define a target ring for an ABS speed sensor. A fifth bearing has an ABS speed sensor positioned in the bearing cavity and attached to a shaft proximate the outboard opening and has a target ring positioned in the bearing cavity and attached to the outer race assembly.

4 Claims, 5 Drawing Sheets

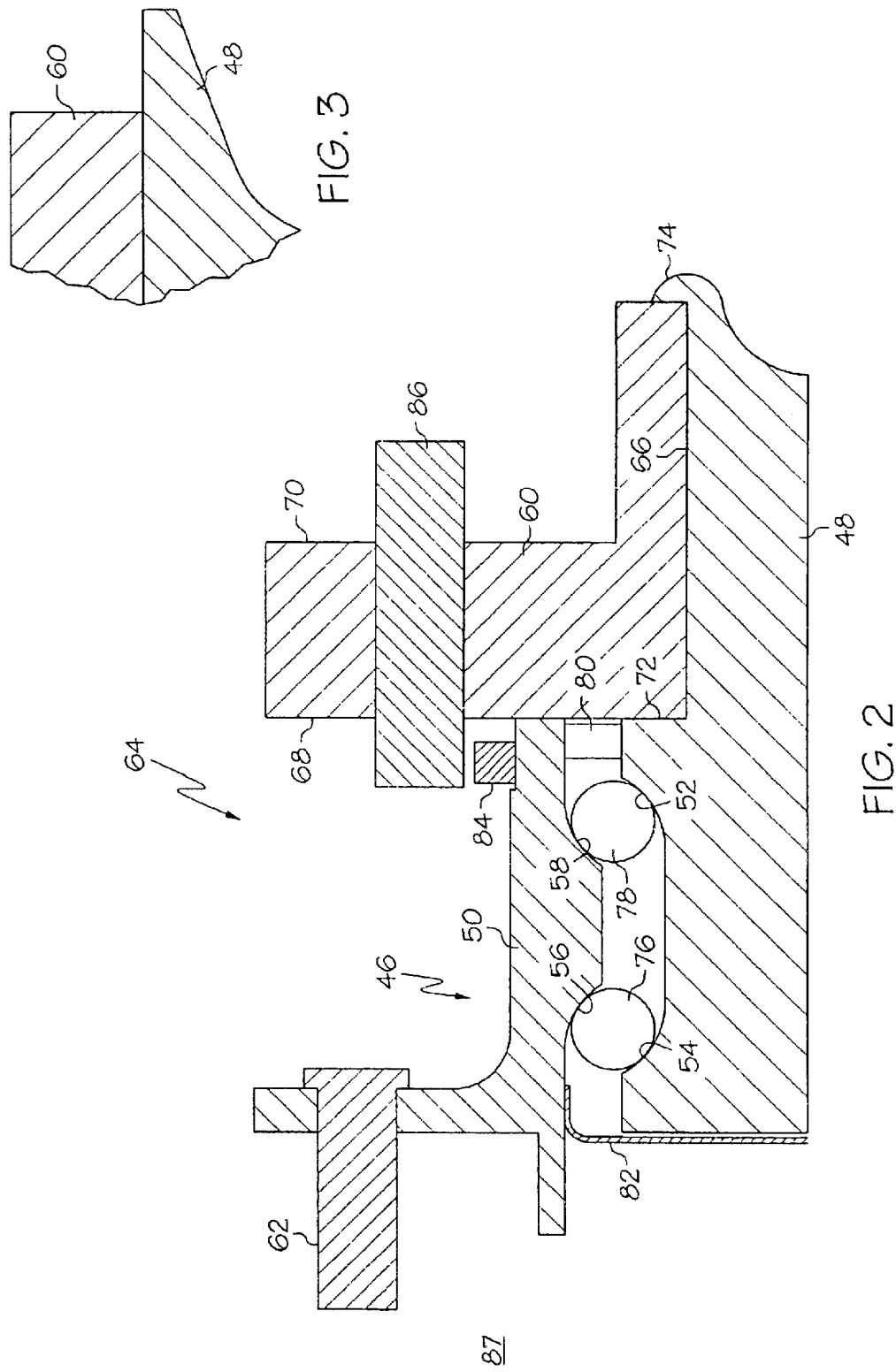

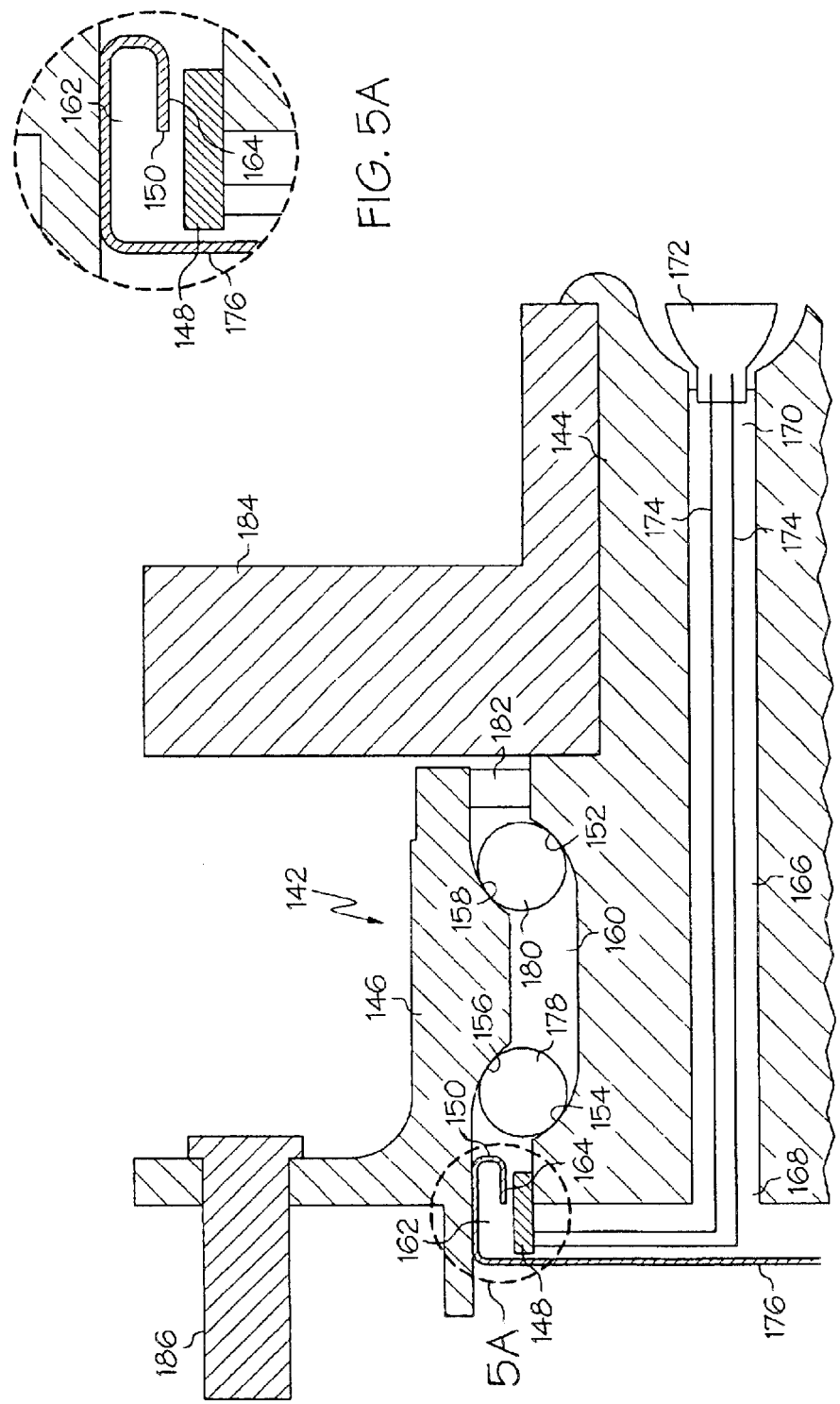

VEHICLE WHEEL BEARING

TECHNICAL FIELD

The present invention relates generally to vehicles, and more particularly to a vehicle wheel bearing.

BACKGROUND OF THE INVENTION

Vehicles include automotive vehicles having wheel bearings such as the wheel bearing 10 shown in a below-centerline, cross-sectional view in prior art FIG. 1. The bearing 10 includes the outer race assembly 12 having studs 14 to which a wheel (not shown) is attached. The bearing 10 also includes outboard and inboard inner races 16 and 18, balls 20 and 21 and outboard and inboard seals 22 and 24. These separate pieces are assembled together into a greased unit. A shaft 26 is pressed into the bore 28 of a knuckle member 30 (only a portion of which is shown) from the inboard side 32 until a shoulder 34 of the shaft 26 abuts an inboard-facing surface 36 of the knuckle member 30. Then, the bearing 10 is pressed onto the shaft 26 and against an outboard-facing surface 38 of the knuckle member 30. Finally, a retention nut 40 is threaded onto a threaded end of the shaft 26. An anti-lock-braking-system (ABS) speed sensor 42 is attached to the knuckle member 30 and senses the rotation of a target ring 44 attached to the rotating outer race assembly 12. The retention nut 40 has the potential to loosen which can lead to reduced bearing life, bearing noise, and ABS speed sensor 42 failure. Although the bearing components are protected from the wheel environment by the outboard and inboard seals 22 and 24, the ABS speed sensor 42 and the target ring 44 are not and require separate protection from the wheel environment. The prior art bearing 10 of FIG. 1 is relatively costly to manufacture, assemble into a unit, and attach to the knuckle member 30.

What is needed is an improved vehicle wheel bearing.

SUMMARY OF THE INVENTION

A first expression of a first embodiment of the invention is for a vehicle wheel bearing having a vehicle-wheel-bearing monolithic shaft and a vehicle-wheel-bearing monolithic outer race assembly. The shaft includes an inboard inner race and an outboard inner race. The outer race assembly surrounds the shaft and includes an outboard outer race and an inboard outer race.

A second expression of a first embodiment of the invention is for a vehicle wheel bearing having a vehicle-wheel-bearing monolithic, non-rotatable shaft and a vehicle-wheel-bearing monolithic, rotatable outer race assembly. The shaft is attachable to a vehicle suspension component and includes an inboard inner race and an outboard inner race. The outer race assembly is attachable to a vehicle wheel, surrounds the shaft, and includes an outboard outer race and an inboard outer race.

A third expression of a first embodiment of the invention is for a vehicle wheel bearing assembly including a vehicle knuckle member and a vehicle wheel bearing. The vehicle knuckle member has a bore and has a substantially-outboard-facing surface and a substantially-inboard-facing surface. The vehicle wheel bearing has a monolithic, non-rotatable shaft, an inboard inner race, and a monolithic, rotatable outer race assembly. The shaft includes an outboard inner race and a shoulder. The shaft is located in and circumferentially contacts the bore. The shoulder abuts the substantially-outboard-facing surface. The shaft is attached to the vehicle knuckle member against the substantially-inboard-facing surface. The outer race assembly surrounds the shaft and includes an outboard outer race and an inboard outer race. In one example, the shaft and the inboard inner race define a monolithic structure. In the same or a different design, the shaft has a deformed portion which abuts the substantially-inboard-facing surface.

A first expression of a second embodiment of the invention is for a vehicle wheel bearing including a vehicle-wheel-bearing shaft having an inner race, including a vehicle-wheel-bearing outer race assembly having an outer race, and including an end cap. The outer race assembly is positioned radially outwardly apart from the shaft creating a bearing cavity. The bearing cavity has a substantially-circular outboard opening. The end cap is attached to the outer race assembly and has a portion covering the outboard opening, wherein the portion is at least partially disposed in the bearing cavity, and wherein the portion has a substantially toroidal shape.

A second expression of a second embodiment of the invention is for a vehicle wheel bearing including a vehicle-wheel-bearing non-rotatable shaft having an inner race, including a vehicle-wheel-bearing rotatable outer race assembly including an outer race, and including an inboard seal. The outer race assembly is positioned radially outwardly apart from the shaft creating a bearing cavity. The bearing cavity has a substantially-circular inboard opening. The inboard seal has a member attached to the outer race assembly, wherein the member has a first portion substantially covering the inboard opening and has a second portion extending radially outwardly of the outer race assembly. The second portion defines a target ring for an anti-lock-braking-system speed sensor.

A first expression of a third embodiment of the invention is for a vehicle wheel bearing including a vehicle-wheel-bearing non-rotatable shaft having an inner race, including a vehicle-wheel-bearing rotatable outer race assembly having an outer race, including an anti-lock-braking-system (ABS) speed sensor, and including a target ring. The outer race assembly is positioned radially outwardly apart from the shaft creating a bearing cavity. The bearing cavity has a substantially-circular outboard opening. The ABS speed sensor is positioned in the bearing cavity and is attached to the shaft proximate the outboard opening. The target ring is positioned in the bearing cavity, is attached to the outer race, and has a portion located to be sensed by the ABS speed sensor.

Several benefits and advantages are derived from one or more of the expressions and embodiments of the invention. Having a monolithic shaft with inboard and outboard inner races and having a monolithic outer race assembly with inboard and outboard outer races reduces manufacturing costs. Having a monolithic shaft with an outboard inner race, a shoulder, and a deformed portion, wherein the shoulder abuts the outboard-facing surface of the vehicle knuckle member and wherein the deformed portion abuts the inboard-facing surface of the knuckle member secures the bearing to the knuckle member without using a retention nut which can loosen leading to reduced bearing life, bearing noise, and ABS speed sensor failure. Having an outboard end cap with a toroidal portion in the bearing cavity allows the toroidal portion to act as a safety retention ring when arcuate finger-type ball separators are used in the bearing cavity thus integrating sealing and safety retention functions into a single member reducing costs. Having an inboard seal extend outside the bearing cavity to also function as a target ring for an ABS speed sensor integrates sealing and target ring features into a single member reducing costs. Having an ABS speed sensor positioned in the bearing cavity and attached to the shaft proximate the outboard opening of the cavity and having the target ring positioned in the bearing cavity and attached to the outer race assembly places the ABS speed sensor and target ring inside the bearing where an existing bearing seal or end cap offers protection from the wheel environment without the need for a separate seal for the ABS speed sensor and target ring.

SUMMARY OF THE DRAWINGS

FIG. 2 is an above-centerline, cross-sectional view of a first embodiment of a vehicle wheel bearing of the invention and a vehicle knuckle member;

FIG. 3 is a view of an inboard portion of FIG. 2 showing the inboard-facing surface of the knuckle member and a portion of the shaft before that portion is deformed to abut the inboard-facing surface of the knuckle member;

FIG. 5 is an above-centerline and partially-below-centerline, cross-sectional view of a third embodiment of a vehicle wheel bearing of the invention and a vehicle knuckle member.

DESCRIPTION OF THE PREFERRED EMBODIMENTS

Figure 1:
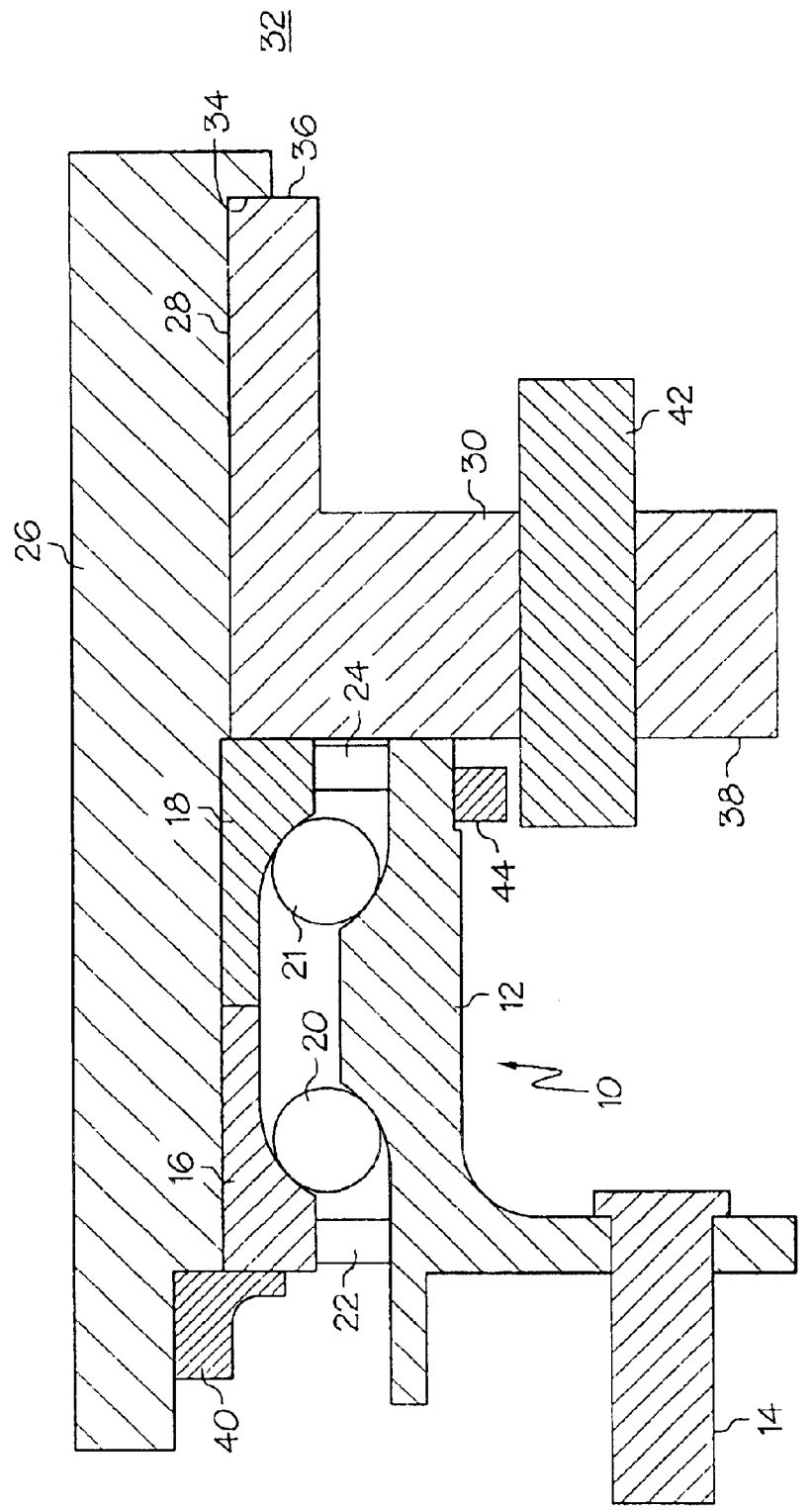
FIG. 1 is a below-centerline, cross-sectional view of a prior art vehicle wheel bearing and vehicle knuckle member.

Referring now to the drawings, FIG. 2 illustrates a first embodiment of the present invention. A first expression of the first embodiment is for a vehicle wheel bearing 46 including a vehicle-wheel-bearing monolithic shaft 48 and a vehicle-wheel-bearing monolithic outer race assembly 50. Examples of wheeled vehicles having wheel bearings include, without limitation, automobiles and trucks. The shaft 48 includes an inboard inner race 52 and an outboard inner race 54. The outer race assembly 50 surrounds the shaft 48 and includes an outboard outer race 56 and an inboard outer race 58. Thus, the inboard inner race 52, the outboard inner race 54, and other portions of the shaft 48 define a monolithic structure. Likewise, the outboard outer race 56, the inboard outer race 58, and other portions of the outer race assembly 50 define a monolithic structure. Monolithically integrating the inner races 52 and 54 with the shaft 48 saves manufacturing costs.

A second expression of the first embodiment shown in FIG. 2 is for a vehicle wheel bearing 46 including a vehicle-wheel-bearing monolithic, non-rotatable monolithic shaft 48 and a vehicle-wheel-bearing monolithic, rotatable outer race assembly 50. The shaft 48 is attachable to a vehicle suspension component (such as but not limited to a vehicle knuckle member 60, wherein for purposes of describing the invention, the vehicle knuckle member 60 is considered part of the vehicle suspension system). The shaft 48 includes an inboard inner race 52 and an outboard inner race 54. The outer race assembly 50 is attachable to a vehicle wheel (not shown) such as, without limitation, by having the vehicle wheel be mounted on wheel studs 62 attached to the outer race assembly 50. The outer race assembly 50 surrounds the shaft 48 and includes an outboard outer race 56 and an inboard outer race 58.

A third expression of the first embodiment shown in FIG. 2 is for a vehicle wheel bearing assembly 64 including a vehicle knuckle member 60, and a vehicle wheel bearing 46. As previously mentioned, the vehicle knuckle member 60 is considered part of the vehicle suspension system for purposes of describing the invention and is connected to other vehicle suspension components, not shown, as is known to those skilled in the art. The vehicle knuckle member 60 has a bore 66 and has a substantially-outboard-facing surface 68 and a substantially-inboard-facing surface 70. The vehicle wheel bearing 46 includes a monolithic, non-rotatable monolithic shaft 48, an inboard inner race 52, and a monolithic, rotatable outer race assembly 50. The shaft 48 includes an outboard inner race 54 and a shoulder 72. The shaft 48 is disposed in the bore 66. The shoulder 72 abuts the substantially-outboard-facing surface 68. The shaft 48 is attached to the vehicle knuckle member 60 against the substantially-inboard-facing surface 70. The outer race assembly 50 surrounds the shaft 48 and includes an outboard outer race 56 and an inboard outer race 58.

In one example of the third expression, the shaft 48 circumferentially contacts the wall of the bore 66 such as with a press-fit. In one construction, the shaft 48 and the inboard inner race 52 define a monolithic structure as shown in FIG. 2. In another construction, not shown in FIG. 2, shaft 48 and the inboard inner race 52 are separate members. In this other construction, the shaft 48 monolithically includes the outboard inner race 54 but does not monolithically include the inboard inner race 52.

In one implementation of the third expression, the shaft 48 has a deformed portion 74 which abuts the substantially-inboard-facing surface 70 of the vehicle knuckle member 60. The shoulder 72 and the deformed portion 74 of the shaft 48 abuttingly secure the shaft 48 (and hence the entire vehicle wheel bearing 46) to the vehicle knuckle member 60 without the use of a retention nut which could loosen leading to reduced bearing life, bearing noise, and ABS speed sensor failure. Before deformation, in one construction, the inboard end of the shaft 48 has a ledge shape as shown in FIG. 3.

In one design of the third expression, the outboard inner and outer races 54 and 56 define an outboard raceway containing rolling elements such as, but not limited to, balls 76. Likewise, in this design, the inboard inner and outer races 52 and 58 define an inboard raceway containing rolling elements such as, but not limited to, balls 78. In one modification, not shown, an outboard annular separator ring having dimples to hold and separate the balls 76 is disposed in the outboard raceway, and an inboard annular separator ring having dimples to hold and separate the balls 78 is disposed in the inboard raceway. In one variation, not shown, each annular separator ring is replaced with a plurality of arcuate separators each having radially-inwardly-extending fingers to separate the balls. The use of annular separator rings and/or arcuate separators is known to the artisan.

In one modification of the third expression, the vehicle wheel bearing 46 also includes an inboard seal 80 and further includes an outboard end cap 82 which is attached to a radially-inward-facing surface of the outer race assembly 50 and which sealingly extends to the outer race assembly 50. It is noted that in this modification, the outboard end cap 82 is less expensive to use than a conventional outboard seal. In one variation, a target ring 84 is attached to a radially-outwardly-facing surface of the outer race assembly 50 to be sensed by an ABS speed sensor 86 attached to the vehicle knuckle member 60.

During assembly of the vehicle wheel bearing 46, it may be necessary to use a "Conrad"-type assembly, as is known in the art, where, instead of the balls being placed in the dimples of an annular separator before enclosure by a separate race, the balls are first placed between opposing races and then an arcuate finger-type separator is inserted into the raceway. In one assembly method for the vehicle wheel bearing assembly 64 shown in FIG. 2, the greased and assembled vehicle wheel bearing 46 is brought as a unit (including at least the shaft 48, the outer race assembly 50, the balls 76 and 78, the inboard seal 80, and the outboard end cap 82) to the area of the vehicle knuckle member 60. The shaft 48 is press fit from the outboard side 87 into the bore 66 of the vehicle knuckle member 60 with the shoulder 72 of the shaft 48 abutting the outboard-facing surface 68 of the vehicle knuckle member 60. Then the inboard end of the shaft 48 seen in FIG. 3 is rolled by a tool (not shown) and deformed into the deformed portion 74 seen in FIG. 2.

Figure 4:
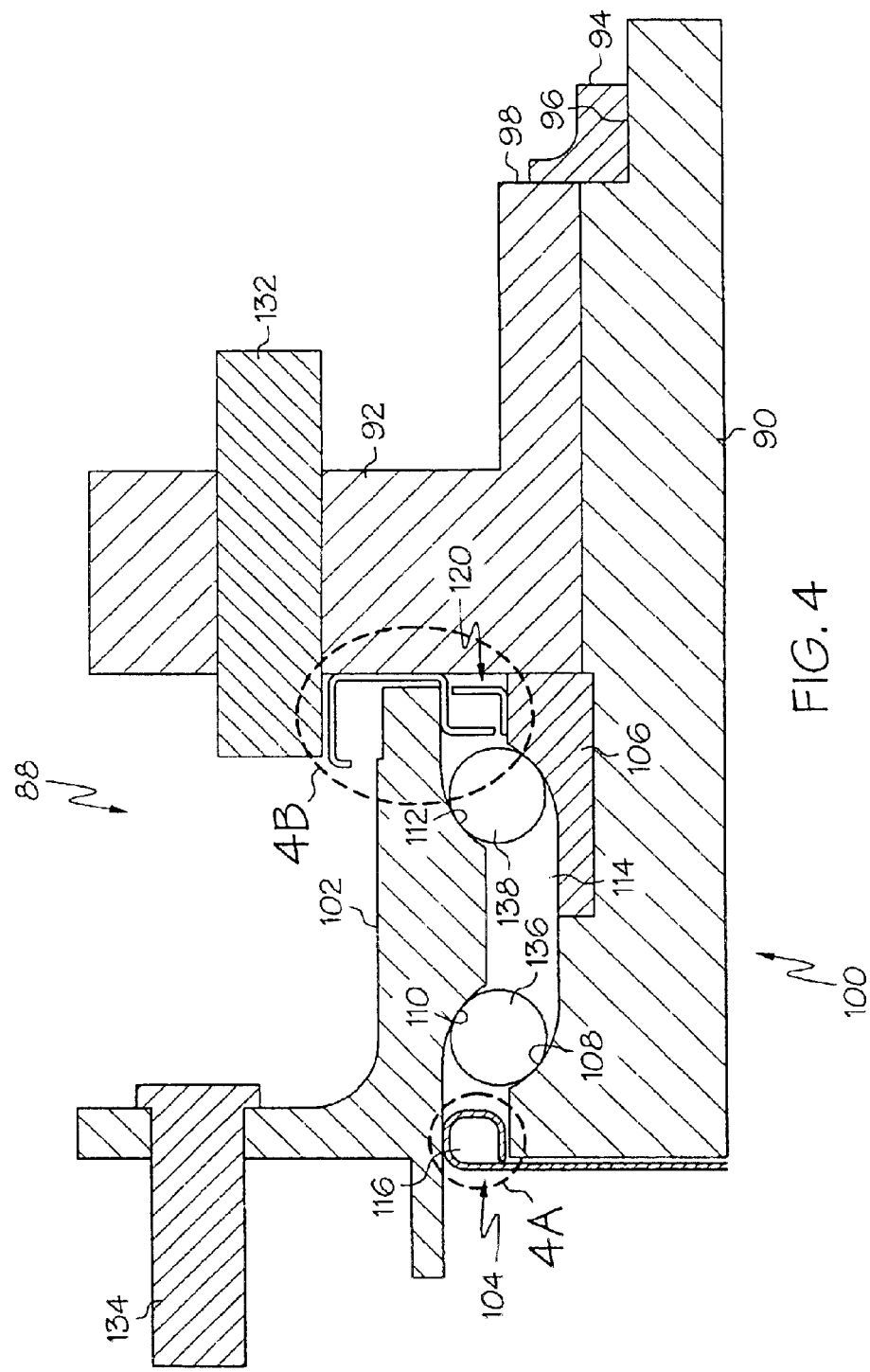
FIG. 4 is an above-centerline, cross-sectional view of a second embodiment of a vehicle wheel bearing of the invention and a vehicle knuckle member.
Figure 4B:
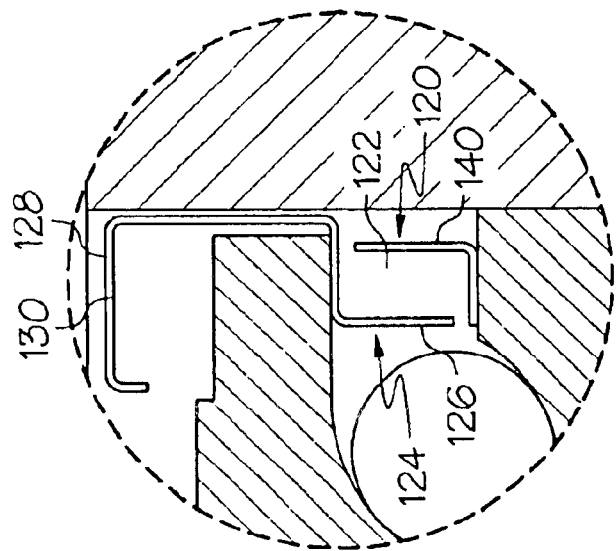
Figure 4A:
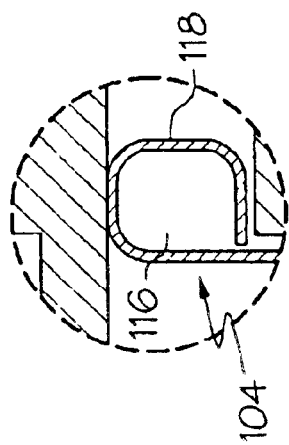

A second embodiment of the invention is shown in FIG. 4. A first depiction of the second embodiment shown in FIG. 4 is for a vehicle wheel bearing assembly 88 and is identical to the previously described third expression of the first embodiment except for the way the inboard end of the shaft 90 is attached to the vehicle knuckle member 92. In the first depiction of the second embodiment, the vehicle wheel bearing assembly 88 also includes a retention nut 94. The shaft 90 has a threaded end 96, and the retention nut 94 is threadably attached to the threaded end 96 and abuts the substantially-inboard-facing surface 98 of the vehicle knuckle member 92.

A first expression of the second embodiment shown in FIG. 4 is for a vehicle wheel bearing 100 including a vehicle-wheel-bearing shaft 90, a vehicle-wheel-bearing outer race assembly 102, and an end cap 104. The shaft 90 has an inner race 106 and 108. The outer race assembly 102 has an outer race 110 and 112 and is disposed radially outwardly apart from the shaft 90 creating a bearing cavity 114, wherein the bearing cavity 114 has a substantially-circular outboard opening 116. The end cap 104 is attached to the outer race assembly 102 and has a portion 118 covering the outboard opening 116. The portion 118 is at least partially disposed in the bearing cavity 114, and the portion 118 has a substantially toroidal shape. Having an end cap 104 with a toroidal portion 118 in the bearing cavity 114 allows the toroidal portion 118 to act as a safety retention ring when arcuate finger-type ball separators are used in the bearing cavity thus integrating sealing and safety retention functions into a single member reducing costs.

A second expression of the second embodiment shown in FIG. 4 is for a vehicle wheel bearing 100 including a vehicle-wheel-bearing shaft 90, a vehicle-wheel-bearing outer race assembly 102, and an inboard seal 120. The shaft 90 has an inner race 106 and 108. The outer race assembly 102 includes an outer race 110 and 112 and is disposed radially outwardly apart from the shaft 90 creating a bearing cavity 114, wherein the bearing cavity 114 has a substantially-circular inboard opening 122. The inboard seal 120 has a member 124 attached to the outer race assembly 102, wherein the member 124 has a first portion 126 substantially covering the inboard opening 122 and has a second portion 128 extending radially outwardly of the outer race assembly 102, and wherein the second portion 128 defines a target ring 130 for an anti-lock-braking-system (ABS) speed sensor 132. Having an inboard seal extend outside the bearing cavity to also function as a target ring for an ABS speed sensor integrates sealing and target ring features into a single member reducing costs.

In one example of the second embodiment shown in FIG. 4, the vehicle wheel bearing assembly 88 also includes wheel studs 134, and balls 136 and 138, as shown, wherein the inboard inner race 106 is shown as a separate member and not as a monolithic portion of the shaft 90. In one construction, the inboard seal 120 also has another member 140 attached to the inboard inner race 106, wherein both members 124 and 140, within the bearing cavity 114, comprise stainless steel with elastomer lips.

A third embodiment of the invention is shown in FIG. 5. A first expression of the third embodiment shown in FIG. 5 is for a vehicle wheel bearing 142 including a vehicle-wheel-bearing non-rotatable shaft 144, a vehicle-wheel-bearing rotatable outer race assembly 146, an anti-lock-braking-system (ABS) speed sensor 148, and a target ring 150. The shaft 144 has an inner race 152 and 154. The outer race assembly 146 has an outer race 156 and 158 and is disposed radially outwardly apart from the shaft 144 creating a bearing cavity 160, wherein the bearing cavity 160 has a substantially-circular outboard opening 162. The ABS speed sensor 148 is disposed in the bearing cavity 160 and is attached to the shaft 144 proximate the outboard opening 162. The target ring 150 is disposed in the bearing cavity 160, is attached to the outer race assembly 146, and has a portion 164 disposed to be sensed by the ABS speed sensor 148.

In one example of the first expression of the third embodiment, the shaft 144 has a central bore 166 having an outboard end 168 and an inboard end 170. A wire connector 172 is disposed at the inboard end 170, and wiring 174 is disposed in the central bore 166 and connects the ABS speed sensor 148 and the wire connector 172. In the same or a different example, an end cap 176 is attached to the outer race assembly 146 and covers the outboard opening 162 of the bearing cavity 160 and the outboard end 168 of the central bore 166. In the same or another example, the target ring 150 is an extension of the end cap 176. The orientation of the target ring 150 and the ABS speed sensor 148 is left to the artisan. Having an ABS speed sensor positioned in the bearing cavity and attached to the shaft proximate the outboard opening of the cavity and having the target ring positioned in the bearing cavity and attached to the outer race assembly places the ABS speed sensor and target ring inside the bearing where an existing bearing seal or end cap offers protection from the wheel environment without the need for a separate seal for the ABS speed sensor and target ring. In one construction, the vehicle wheel bearing 142 also includes balls 178 and 180 and an inboard seal 182. In one modification, the shaft 144 is attached to a vehicle knuckle member 184, and wheel studs 186 are attached to the uter race assembly 146.

It is noted that the previously-described examples, constructions, implementations, designs, modifications, variations, and depictions of any expression of an embodiment can be combined, as appropriate, in that expression and/or can be used, as appropriate, in any other embodiment, as can be appreciated by the artisan.

The foregoing description of a several expressions and embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A vehicle wheel bearing assembly comprising:
   a) a vehicle knuckle member which has a bore, which has a substantially-outboard-facing surface and a substantially-inboard-facing surface; and b) a vehicle wheel bearing having:
   (1) a monolithic, non-rotatable shaft which includes an outboard inner race and a shoulder, wherein the shaft is disposed in the bore, wherein the shoulder abuts the substantially-outboard-facing surface, and wherein the shaft is attached to the vehicle knuckle member against the substantially-inboard-facing surface;
   (2) an inboard inner race; and
   (3) a monolithic, rotatable outer race assembly which surrounds the shaft and which includes an outboard outer race and an inboard outer race.

2. A vehicle wheel bearing assembly comprising:
a) a vehicle knuckle member which has a bore, which has a substantially-outboard-facing surface and a substantially-inboard-facing surface; and
b) a vehicle wheel bearing having:
   (1) a monolithic, non-rotatable shaft which includes an outboard inner race and a shoulder, wherein the shaft is disposed in the bore, wherein the shoulder abuts the substantially-outboard-facing surface, and wherein the shaft is attached to the vehicle knuckle member against the substantially-inboard-facing surface;
   (2) an inboard inner race; and
   (3) a monolithic, rotatable outer race assembly which surrounds the shaft and which includes an outboard outer race and an inboard outer race, wherein the shaft and the inboard inner race define a monolithic structure.

3. A vehicle wheel bearing assembly comprising:
a) a vehicle knuckle member which has a bore, which has a substantially-outboard-facing surface and a substantially-inboard-facing surface: and
b) a vehicle wheel bearing having:
   (1) a monolithic, non-rotatable shaft which includes an outboard inner race and a shoulder, wherein the shaft is disposed in the bore, wherein the shoulder abuts the substantially-outboard-facing surface, and wherein the shaft is attached to the vehicle knuckle member against the substantially-inboard-facing surface;
   (2) an inboard inner race; and
   (3) a monolithic, rotatable outer race assembly which surrounds the shaft and which includes an outboard outer race and an inboard outer race, wherein the shaft has a deformed portion which abuts the substantially-inboard-facing surface.

4. The vehicle wheel bearing assembly of claim 3, wherein the shaft and the inboard inner race define a monolithic structure.

* * * * *